United States Patent
Chen

(10) Patent No.: US 10,812,679 B2
(45) Date of Patent: Oct. 20, 2020

(54) PICTURE DATA TRANSMISSION METHOD AND DEVICE

(71) Applicant: GUANGZHOU UCWEB COMPUTER TECHNOLOGY CO., LTD., Guangzhou (CN)

(72) Inventor: Binghui Chen, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 281 days.

(21) Appl. No.: 15/607,927

(22) Filed: May 30, 2017

(65) Prior Publication Data

US 2017/0264784 A1 Sep. 14, 2017

Related U.S. Application Data

(63) Continuation of application No. PCT/CN2015/097416, filed on Dec. 15, 2015.

(30) Foreign Application Priority Data

Dec. 16, 2014 (CN) .......................... 2014 1 0787862

(51) Int. Cl.
  *H04N 1/40* (2006.01)
  *H04N 1/417* (2006.01)
  (Continued)

(52) U.S. Cl.
  CPC ............. *H04N 1/417* (2013.01); *G06T 9/001* (2013.01); *H04N 19/12* (2014.11);
  (Continued)

(58) Field of Classification Search
  CPC ...... H04N 1/417; H04N 19/12; H04N 19/146; H04N 19/172; H04N 12/40; H04N 19/10; H04N 19/60; H04N 1/41; G06T 9/001
  See application file for complete search history.

(56) References Cited

U.S. PATENT DOCUMENTS 6,931,159 B2 * 8/2005 Ridge ...................... G06T 3/40
                                                              375/240.2
8,331,705 B2   12/2012 Shiraishi et al.
(Continued)

FOREIGN PATENT DOCUMENTS

CN   101742312 A    6/2010
CN   102253871 A   11/2011
(Continued)

OTHER PUBLICATIONS

International Search Report and Written Opinion for Application No. PCT/CN2015/097416, dated Mar. 15, 2016, 8 pages.
(Continued)

*Primary Examiner* — Cheukfan Lee
(74) *Attorney, Agent, or Firm* — Sheppard Mullin Richter & Hampton LLP

(57) ABSTRACT

A picture data transmission method and device are disclosed in the present invention. The picture data transmission method comprises: recoding a first picture to be transmitted, by a picture data sending terminal, to obtain a second picture, wherein the file size of the second picture is smaller than that of the first picture, and a quality difference between the second picture and the first picture is less than a pre-set threshold; and selecting one of the first picture and the second picture according to quality values of the first picture and the second picture and sending the selected picture to a picture data receiving terminal. According to the present invention, pictures can be recoded to obtain pictures with a small amount of data for data transmission, without affecting the picture quality, thereby saving network resources and reducing storage pressure.

10 Claims, 4 Drawing Sheets

(51) Int. Cl.
- *H04N 19/172* (2014.01)
- *H04N 19/146* (2014.01)
- *H04N 19/12* (2014.01)
- *H04N 19/40* (2014.01)
- *G06T 9/00* (2006.01)
- *H04N 1/41* (2006.01)
- *H04N 19/10* (2014.01)
- *H04N 19/60* (2014.01)

(52) U.S. Cl.
CPC ......... *H04N 19/146* (2014.11); *H04N 19/172* (2014.11); *H04N 19/40* (2014.11); *H04N 1/41* (2013.01); *H04N 19/10* (2014.11); *H04N 19/60* (2014.11)

(56) References Cited

U.S. PATENT DOCUMENTS

| | | | |
|---|---|---|---|
| 9,003,290 B2 * | 4/2015 | Goran | G06F 3/0481 715/723 |
| 9,307,245 B2 | 4/2016 | Takada | |
| 2011/0206278 A1 * | 8/2011 | Tysowski | H04N 19/172 382/166 |
| 2017/0026457 A1 | 1/2017 | Wei et al. | |

FOREIGN PATENT DOCUMENTS

| | | |
|---|---|---|
| CN | 102438102 A | 5/2012 |
| CN | 102594872 A | 7/2012 |
| CN | 102769752 A | 11/2012 |
| CN | 102932671 A | 2/2013 |
| CN | 103796013 A | 5/2014 |
| CN | 103986696 A | 8/2014 |
| WO | 2014/045507 A1 | 3/2014 |
| WO | 2014080597 A1 | 5/2014 |

OTHER PUBLICATIONS

International Preliminary Report on Patentability for Application No. PCT/CN2015/097416, dated Jun. 20, 2017, (with English Translation) 10 pages.
First Search dated Dec. 6, 2017, issued in related Chinese Application No. 201410787862.3 (2 pages).
First Office Action dated Dec. 18, 2017, issued in related Chinese Application No. 201410787862.3, with English machine translation (16 pages).
Supplementary Search dated Jul. 10, 2018, issued in related Chinese Application No. 201410787862.3 (2 pages).
Second Office Action dated Jul. 19, 2018, issued in related Chinese Application No. 201410787862.3, with English machine translation (36 pages).
Third Office Action dated Nov. 20, 2018, issued in related Chinese Application No. 201410787862.3, with English machine translation (35 pages).

\* cited by examiner

PICTURE DATA TRANSMISSION METHOD AND DEVICE

CROSS-REFERENCE TO RELATED APPLICATIONS

This application is a continuation application of International Application No. PCT/CN2015/097416, filed on Dec. 15, 2015, which is based on and claims priority to and benefits of Chinese Patent Applications No. 201410787862.3, filed with the State Intellectual Property Office (SIPO) of the People's Republic of China on Dec. 16, 2014. The entire contents of the above-identified application are incorporated herein by reference.

TECHNICAL FIELD

The present invention relates to the field of network transmission technology, and in particular, to a picture data transmission method and device.

BACKGROUND ART

In the prior art, when pictures are shared via the Internet, data of the pictures needs to be transmitted to a picture sharing website. At present, many products provide cloud server storage capabilities, and particularly, many products provide the capabilities of storing photos uploaded from users' cellphones to a server. With the increase in the resolution of cellphone cameras, the file size of photos taken also becomes larger.

For example, a photo taken by a cellphone is about 1.2 MB and is stored in a JPEG format; even in the WIFI environment, the uploading of such a photo to a server is time- and traffic-consuming, and the user's experience is quite poor.

Usually, the picture format of the photos taken by a camera is JPEG which is a very common picture format but not the best one; on the other hand, not all the picture formats are supported by the cellphones.

SUMMARY OF INVENTION

The present disclosure provides a picture data transmission method and device, so that pictures can be recoded to obtain pictures with a small amount of data for data transmission, without affecting the picture quality, thereby saving network resources and reducing storage pressure.

In order to solve the technical problem mentioned above, one technical solution employed in the present disclosure is to provide a picture data transmission method, which comprises: recoding a first picture to be transmitted, by a picture data sending terminal, to obtain a second picture, wherein the file size of the second picture is smaller than that of the first picture, and a quality difference between the second picture and the first picture is less than a pre-set threshold; and selecting one of the first picture and the second picture according to quality values of the first picture and the second picture and sending the selected picture to a picture data receiving terminal.

The selecting one of the first picture and the second picture according to quality values of the second picture and sending the selected picture to a picture data receiving terminal comprises: determining whether the picture quality of the second picture is higher than a pre-set value; and sending the second picture to the picture data receiving terminal, if the picture quality of the second picture is higher than the pre-set value, and sending the first picture to the picture data receiving terminal, if the picture quality of the second picture is lower than the pre-set value.

The determining whether a picture quality related parameter of the second picture is higher than a pre-set value comprises: determining whether a resolution or brightness of the second picture is higher than a pre-set value, wherein the picture quality related parameter comprises at least one of the following parameters: resolution and brightness.

The method further comprises performing, by the picture data receiving terminal, a corresponding reverse recoding according to data of the received second picture to obtain a third picture, wherein a quality difference between the third picture and the first picture is less than the pre-set threshold.

The method further comprises: the picture data sending terminal requesting acquisition of the second picture from the picture data receiving terminal, wherein the second picture is stored in the picture data receiving terminal; and receiving the second picture from the picture data receiving terminal and performing the corresponding reverse recoding on the second picture to obtain a fourth picture, wherein a quality difference between the fourth picture and the second picture is less than the pre-set threshold.

The recoding a first picture to be transmitted, by the picture data sending terminal, to obtain a second picture includes reducing the pixel of the first picture and recoding the first picture that has been subjected to pixel reduction.

The reducing the pixel of the first picture and recoding the first picture that has been subjected to pixel reduction comprises: reducing the pixel of the first picture by the picture data sending terminal when it is determined that the picture quality of the first picture is higher than a pre-set value of picture quality; and recoding the first picture that has been subjected to pixel reduction to obtain a second picture, wherein a quality difference between the second picture and the first picture is less than the pre-set threshold.

The picture format of the first picture and the third picture is JPEG GIF, BMP, PNG, ico or tiff, and the picture format of the second picture and the fourth picture is WEBP or HEVC.

The present disclosure further provides a picture data transmission device, comprising: a first picture format conversion unit, which is configured to recode a first picture to be transmitted to obtain a second picture, wherein the file size of the second picture is smaller than that of the first picture, and a quality difference between the second picture and the first picture is less than a pre-set threshold; and a picture data transmission unit, which is configured to select one of the first picture and the second picture according to quality value of the second picture and send the selected picture to a picture data receiving terminal.

The picture data transmission unit comprises:
a determining sub-unit, which is configured to determine whether the picture quality of the second picture is higher than a pre-set value; and
a picture sending sub-unit, which is configured to send, if the picture quality of the second picture is higher than the pre-set value, the second picture to the picture data receiving terminal, and send, if the picture quality of the second picture is lower than the pre-set value, the first picture to the picture data receiving terminal.

According to some embodiments, the device further comprises: a picture acquisition unit, which is configured to request acquisition of the second picture from the picture data receiving terminal, wherein the second picture is stored in the picture data receiving terminal; a second picture format conversion unit, which is configured to perform the corresponding reverse recoding on the second picture acquired by the picture acquisition unit to obtain a fourth picture, wherein a quality difference between the fourth picture and the second picture is less than the pre-set threshold; and an execution unit, which is configured to display, store or send the fourth picture obtained by the picture format conversion unit.

The present disclosure further provides a picture data transmission device, comprising a processor, a memory, a bus, and a communication interface, wherein the processor, the communication interface and the memory are connected through the bus;

the memory is configured to store a program;

and the processor is configured to call a program stored in the memory through the bus, to execute the picture data transmission method described above.

The present disclosure further provides a non-volatile computer-readable medium with program code executable by a processor, wherein the program code causes the processor to execute the picture data transmission method described above.

The advantageous effects of the present invention lie in that the present invention provides a picture data transmission method and device, wherein, before a first picture is transmitted, the first picture is recoded to obtain a second picture; a picture file is downsized without changing the picture quality and is then transmitted to a picture data receiving terminal, thereby accelerating the transmission. When there is a need to acquire a picture from the picture data receiving terminal, corresponding reverse recoding is performed on the second picture stored in the picture data receiving terminal to obtain a fourth picture which is similar to the first picture. Therefore, according to the present invention, pictures can be further compressed for transmission without affecting the picture quality, thereby saving network resources and improving the user's experience.

DETAILED DESCRIPTION

In order to describe the technical content, structural features, objectives and effects achieved in the present invention in detail, the present invention is described below in detail with reference to the accompanying drawings and embodiments.

Figure 1:
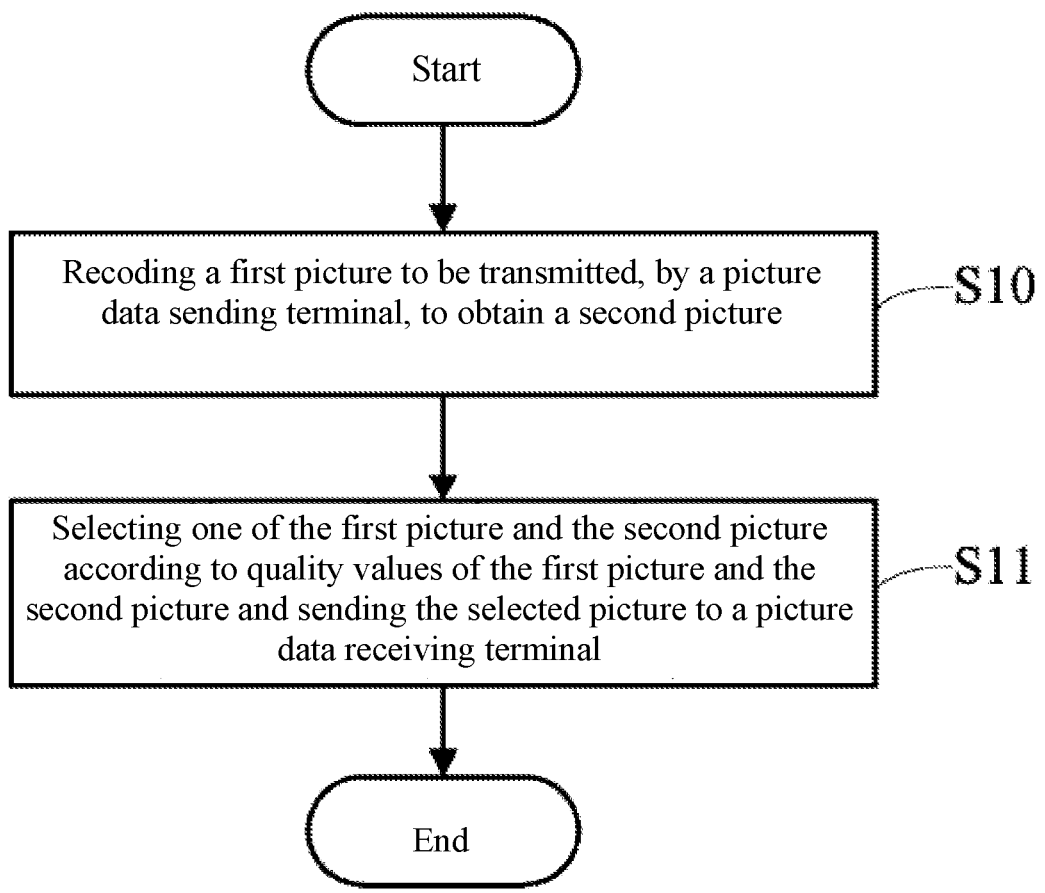
FIG. 1 is a schematic flowchart of a first embodiment of a picture data transmission method according to the present invention.

Referring to FIG. 1, which is a schematic flowchart of a first embodiment of a picture data transmission method according to the present invention. The picture data transmission method shown in the embodiment comprises the following steps:

Step S10, in which a picture data sending terminal recodes a first picture to be transmitted to obtain a second picture.

The file size of the second picture is smaller than that of the first picture, the picture quality of the second picture is comparable to the picture quality of the first picture, and a quality difference between the second picture and the first picture is less than a pre-set threshold.

For example, the picture data sending terminal firstly acquires a first picture desired to be uploaded before uploading the first picture, and specifically, the picture format of the first picture may be a common picture format, such as JPEG; GIF, BMP, PNG, ico or tiff The picture format of the second picture may be a non-common picture format, such as WEBP or HEVC. The file size of a picture in a JPEG format is 900 kb, and when the picture is subjected to format conversion to obtain a picture in an HEVC format, the file size of the picture in the HEVC format is merely 380 kb. The file size of a picture obtained by performing recoding according to the method of the embodiment is reduced to 30%-45% of the file size before the conversion. Therefore, when a picture (the second picture) with the WEBP or HEVC picture format is compressed and uploaded, the file size thereof is smaller than that of a picture with the JPEG or PNG picture format when being compressed and uploaded, and the picture quality of the two pictures is comparable, that is, the picture quality remains substantially unchanged, and a pre-determined range of difference is allowed, which is pre-defined by a user, for example, within 8%, 5% or 3%.

In another embodiment, the recoding a first picture to be transmitted, by the picture data sending terminal, to obtain a second picture may be specified as reducing the pixel of the first picture and recoding the first picture that has been subjected to pixel reduction.

Specifically, the reducing the pixel of the first picture and recoding the first picture that has been subjected to pixel reduction comprises:

reducing the pixel of the first picture by the picture data sending terminal when it is determined that the picture quality of the first picture is higher than a pre-set value of picture quality; and recoding the first picture that has been subjected to pixel reduction to obtain a second picture, wherein a quality difference between the second picture and the first picture is less than the pre-set threshold.

Accordingly, before the first picture is recoded, the pixel of the first picture which has a higher picture quality is reduced, and then the first picture is recoded to obtain a second picture; in such a way, the file size of the second picture becomes even smaller after two adjustments. Therefore, unnecessary resource waste can be avoided under the premise of ensuring the picture quality.

Step S11, in which one of the first picture and the second picture is selected according to quality values of the first picture and the second picture and the selected picture is sent to the picture data receiving terminal.

The picture data receiving terminal may be a cloud server.

Specifically, S11 comprises the following step S111 and step S112:

S111, determining whether the picture quality of the first picture or the second picture is higher than a pre-set value; and S112, sending, if the picture quality of the second picture is higher than the pre-set value, the second picture to the picture data receiving terminal, and sending, if the picture quality of the first picture or the second picture is lower than the pre-set value, the first picture to the picture data receiving terminal.

Specifically, S111 comprises determining whether a picture quality related parameter of the first picture or the second picture is higher than a pre-set value, wherein the picture quality related parameter comprises at least one of the following parameters: resolution and brightness.

In this embodiment, before the first picture is sent, the first picture is recoded to obtain a second picture, wherein the file size of the second picture is smaller than that of the first picture. Therefore, a picture file is transmitted to a picture data receiving terminal after the file size thereof is reduced, thereby saving network resources and improving the user's experience.

Figure 2:
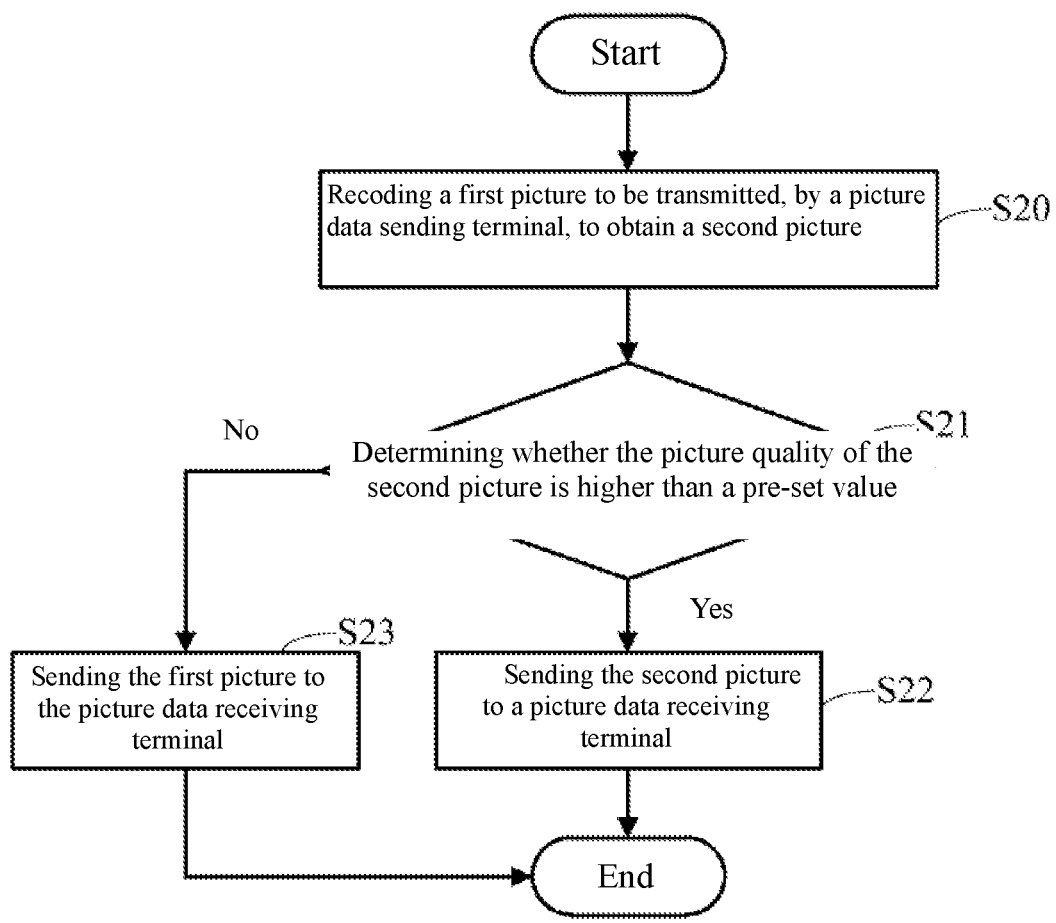
FIG. 2 is a schematic flowchart of a second embodiment of the picture data transmission method according to the present invention.

Reference is made to FIG. 2, which is a schematic flowchart of a second embodiment of the picture data transmission method according to the present invention. The picture data transmission method shown in the embodiment comprises the following steps:

Step S20, in which a picture data sending terminal recodes a first picture to be transmitted to obtain a second picture.

The file size of the second picture is smaller than that of the first picture; the picture quality of the second picture is comparable to the picture quality of the first picture.

Step S21, in which it is determined whether the picture quality of the first picture or the second picture is higher than a pre-set value. In some embodiments, Step S21 determines whether the second picture is higher than a pre-set value. If yes, proceeding to step S22; otherwise, proceeding to step S23.

Specifically, the determining whether the picture quality of the first picture or the second picture is higher than a pre-set value comprises: determining whether the resolution or brightness of the first picture or the second picture is higher than a pre-set value; in addition, the determination can also be performed according to other related parameters that can represent the picture quality, which are not listed one by one here. For example, when the picture brightness of the first picture or the second picture is too low, such as the case of being completely black or of being basically unable to distinguish images in a picture, it can be determined that the brightness of the picture is not higher than the pre-set value, and therefore the picture does not need to be uploaded to a server due to very poor picture quality. For another example, when the picture resolution of the first picture or the second picture is too low, such as images being too blurry, it can be determined that the resolution of the picture is not higher than the pre-set value.

In addition, the determining whether the picture quality of the first picture or the second picture is higher than a pre-set value may further comprise: identifying a particular image in the first picture or the second picture so as to determine whether the image complies with a pre-determined condition, for example, determining whether a human face identified is clear or not and whether red eyes appear.

Step S22, in which the second picture is sent to a picture data receiving terminal.

Step S23, in which the first picture is sent to the picture data receiving terminal.

When the picture quality of the first picture or the second picture is not higher than the pre-set value, that is to say, the quality of the first picture or the quality of the second picture which has been recoded is not ideal, there is no need to transmit the second picture, and the first picture is directly transmitted.

Furthermore, after step S22, that is, the step of sending the second picture to the picture data receiving terminal, the picture data receiving terminal may further perform the corresponding reverse recoding according to data of the second picture received to obtain a third picture which is similar to the first picture, wherein a quality difference between the third picture and the first picture is less than the pre-set threshold.

After the second picture is transmitted to the picture data receiving terminal, in order to be able to display the corresponding picture at the picture data receiving terminal, there is a need to perform the corresponding reverse recoding on the received second picture and convert the same into a picture format that is common to the picture data receiving terminal, and accordingly a third picture is obtained, wherein the third picture and the first picture are substantially the same and have similar properties, so that the picture qualities are comparable, that is, when the resolution of the pictures is within a certain threshold range, it is considered that the qualities of the two pictures are comparable.

Figure 3:
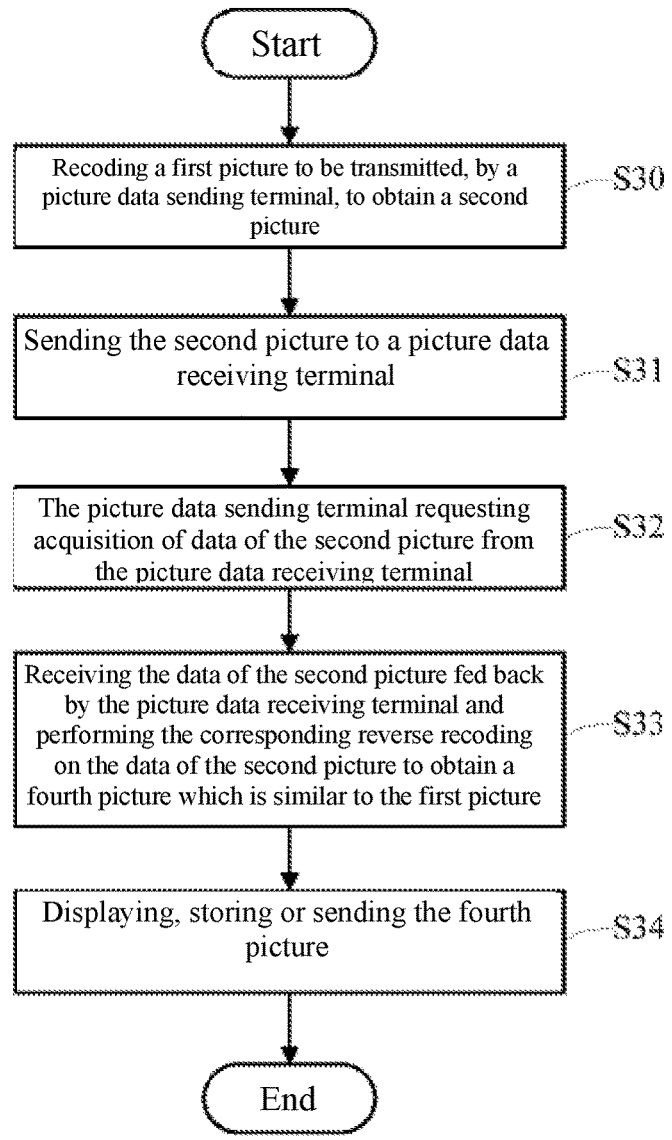
FIG. 3 is a schematic flowchart of a third embodiment of the picture data transmission method according to the present invention.

FIG. 3 is a schematic flowchart of a third embodiment of the picture data transmission method according to the present invention.

Reference is made to FIG. 3, after step S31, that is, the step of sending the second picture to a picture data receiving terminal, the method may further comprise:

Step S32, in which the picture data sending terminal requests acquisition of the second picture from the picture data receiving terminal.

The second picture is stored in the picture data receiving terminal.

Step S33, in which the second picture fed back by the picture data receiving terminal is received and the corresponding reverse recoding is performed on data of the second picture to obtain a fourth picture which is similar to the first picture, wherein a quality difference between the fourth picture and the second picture is less than the pre-set threshold.

When the picture data sending terminal recodes the first picture and sends the same to the picture data receiving terminal for storage, the first picture stored locally can be deleted to release the memory. When there is a need to display the first picture at the picture data sending terminal, the corresponding second picture can be acquired from the picture data receiving terminal, and the corresponding reverse recoding is performed on the second picture locally to obtain a fourth picture, wherein the fourth picture and the second picture are substantially the same and have similar properties, that is, the picture qualities are comparable.

Step S34, in which the fourth picture is displayed, stored or sent. For other steps in FIG. 3, reference may be made to FIG. 1 or 2 and the corresponding descriptive text, and they are not described herein again.

In this embodiment, the picture format of the first picture and the third picture may be a picture format supported by a terminal, such as JPEG; GIF, BMP, PNG, ico or tiff. The picture format of the second picture and the fourth picture is a picture format that is usually not supported by the terminal, such as WEBP or HEVC.

In this embodiment, before the data of the first picture is sent, the first picture is recoded to obtain a second picture, wherein the file size of the second picture is smaller than that of the first picture. Therefore, a picture file is transmitted to a picture data receiving terminal after the file size thereof is reduced, thereby saving network resources and improving the user's experience.

Figure 4:
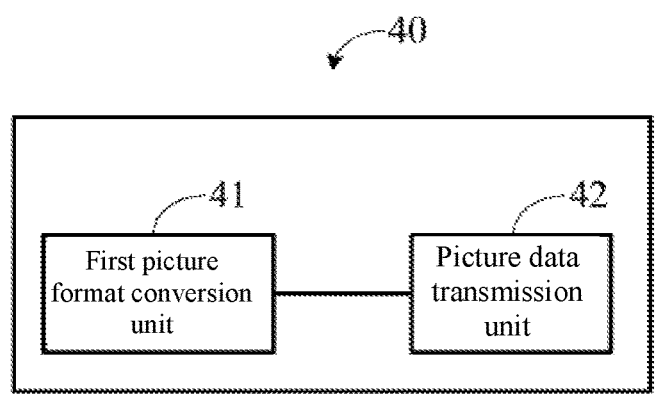
FIG. 4 is a schematic structure diagram of a first embodiment of a picture data transmission device according to the present invention.

Reference is made to FIG. 4, which is a schematic structure diagram of a first embodiment of a picture data transmission device according to the present invention. The device 40 comprises:

a first picture format conversion unit 41, which is configured to recode a first picture to be transmitted to obtain a second picture. The device 40 is a terminal, and the picture format of the first picture may be a picture format common to the terminal, such as JPEG GIF, BMP, PNG, ico or tiff. The file size of the second picture is smaller than that of the first picture, the picture quality of the second picture is comparable to the picture quality of the first picture, and a quality difference between the second picture and the first picture is less than a pre-set threshold. The picture format of the second picture is usually a picture format that is non-common to the terminal, such as WEBP or HEVC. The file size of a picture in a JPEG format is 900 kb, and when the picture is subjected to format conversion to obtain a picture in an HEVC format, the file size of the picture in the HEVC format is merely 380 kb. The file size of a picture obtained by performing format conversion using the device of this embodiment is reduced to 30%-45% of the file size before the conversion. Therefore, when a picture (the second picture) with the WEBP or HEVC picture format is compressed and uploaded, the file size thereof is smaller than that of a picture (the first picture) with the JPEG or PNG picture format when being compressed and uploaded, and the picture quality of the two pictures is comparable, that is, the picture quality remains substantially unchanged, and a pre-determined range of difference is allowed, which is pre-defined by a user, for example, within 8%, 5% or 3%.

A picture data transmission unit 42, which is configured to select one of the first picture and the second picture according to quality values of the first picture and the second picture and send the selected picture to a picture data receiving terminal.

Figure 5:
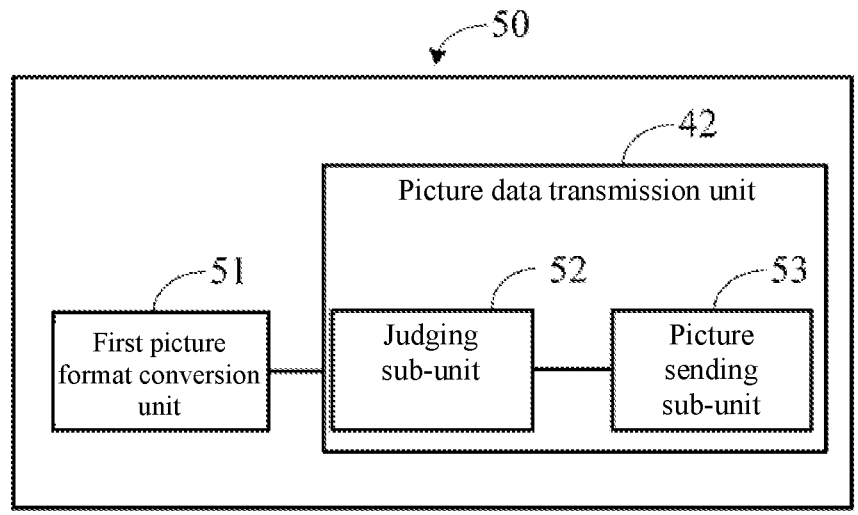
FIG. 5 is a schematic structure diagram of a second embodiment of the picture data transmission device according to the present invention.

The picture data receiving terminal may be a server. Reference is made to FIG. 5, which is a schematic structure diagram of a second embodiment of the present picture data transmission device. The picture data transmission unit 42 comprises: a determining sub-unit 52, which is configured to determine whether the picture quality of the first picture or the second picture is higher than a pre-set value; and a picture sending sub-unit 53, which is configured to send, if the picture quality of the second picture is higher than the pre-set value, the second picture to the picture data receiving terminal, and send, if the picture quality of the first picture or the second picture is lower than the pre-set value, the first picture to the picture data receiving terminal.

In another embodiment, the determining sub-unit 52 is configured to determine whether the picture quality of the first picture is higher than a pre-set value. If the picture quality of the first picture is higher than the pre-set value, the picture sending sub-unit 53 transmits the data of the first picture to the picture data receiving terminal; and when it is determined that the picture quality of the first picture is not higher than the pre-set value, the picture sending sub-unit 53 will not transmit the data of the first picture or the second picture to the picture data receiving terminal.

Specifically, the determining sub-unit 52 determines whether the resolution or brightness of the first picture or the second picture is higher than a pre-set value; in addition, the determination can also be performed according to other related parameters that can represent the picture quality, which are not listed one by one here. For example, when the picture brightness of the first picture or the second picture is too low, such as the case of being completely black or of being basically unable to distinguish images in a picture, it can be determined that the brightness of the picture is not higher than the pre-set value, and therefore the picture does not need to be uploaded to a server due to very poor picture quality. For another example, when the picture resolution of the first picture or the second picture is too low, such as images being too blurry, it can be determined that the resolution of the picture is not higher than the pre-set value.

In addition, the determining sub-unit 52 determining whether the picture quality of the first picture or the second picture is higher than a pre-set value may further comprise: identifying a particular image in the first picture or the second picture so as to determine whether the image complies with a pre-determined condition, for example, determining whether a human face identified is clear or not and whether red eyes appear.

Figure 6:
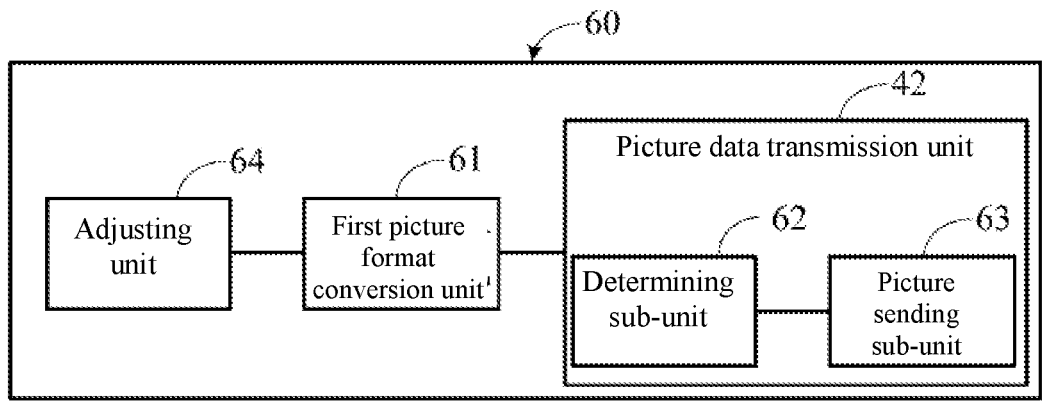
FIG. 6 is a schematic structure diagram of a third embodiment of the picture data transmission device according to the present invention.

Reference is made to FIG. 6, the device 60 further comprises an adjusting unit 64, which is configured to reduce the pixel of the first picture; and the first picture format conversion unit 61 performs format conversion on the first picture which has been adjusted by the adjusting unit 64 to obtain a second picture.

Before the first picture is subjected to format conversion, the adjusting unit 64 reduces the pixel of the first picture, and then recodes the first picture to obtain a second picture; in such way, the file size of the second picture becomes even smaller after two adjustments. Therefore, unnecessary resource waste can be avoided under the premise of ensuring the picture quality.

Furthermore, the determining sub-unit 62 determining whether the picture quality of the first picture or the second picture is higher than a pre-set value may be: determining the picture quality of the first picture which has been adjusted by the adjusting unit 64 and of the second picture obtained by the first picture format conversion unit 61, and may also be: determining the picture quality of the first picture which has not been adjusted by the adjusting unit 64 and of the second picture obtained by the picture format conversion unit 61.

For other modules in FIG. 6, reference may be made to FIG. 4 or FIG. 5 and the corresponding descriptive text.

Figure 7:
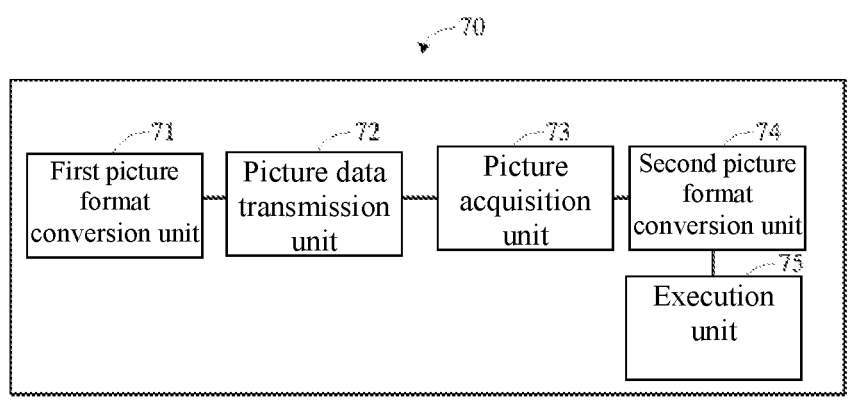
FIG. 7 is a schematic structure diagram of a fourth embodiment of the picture data transmission device according to the present invention.

Referring to FIG. 7, the device 70 further comprises a picture acquisition unit 73 and a second picture format conversion unit 74. The picture acquisition unit 73 is configured to request acquisition of the second picture from the picture data receiving terminal. The device and the picture data receiving terminal are terminals, the second picture is stored in the picture data receiving terminal, and the picture format of the second picture is the one that is usually not supported by the terminals, such as WEBP or HEVC.

The second picture format conversion unit 74 is configured to perform the corresponding reverse recoding on the second picture acquired by the picture acquisition unit 73 to obtain a fourth picture which is similar to the first picture, wherein a quality difference between the fourth picture and the second picture is less than the pre-set threshold. The picture format of the fourth picture may be the one supported by the terminal, such as JPEG GIF, BMP, PNG, ico or tiff.

An execution unit 75 is configured to display, store or send the fourth picture obtained by the second picture format conversion unit 74.

When the picture data receiving terminal is a server, the device 70, as stated above, can download the second picture from the picture data receiving terminal, and perform the corresponding reverse recoding on the second picture to obtain a fourth picture.

For other modules in FIG. 7, reference may be made to FIG. 4 and the corresponding descriptive text.

In other embodiments, for other modules in FIG. 7, reference may be further made to FIG. 5 or 6 and the corresponding descriptive text.

The present invention provides a picture data transmission method and device, wherein, before a first picture is transmitted, the first picture is recoded to obtain a second picture; a picture file is downsized without changing the picture quality and is then transmitted to a picture data receiving terminal, thereby accelerating the transmission. When there is a need to acquire a picture from the picture data receiving terminal, corresponding reverse recoding is performed on the second picture stored in the picture data receiving terminal to obtain a fourth picture which is similar to the first picture. Therefore, according to the present invention, pictures can be further compressed for transmission without affecting the picture quality, thereby saving network resources and improving the user's experience.

The present invention also provides a picture data transmission device, which comprises a processor, a memory, a bus and a communication interface, wherein the processor, the communication interface and the memory are connected through the bus;

the memory is configured to store a program;

and the processor is configured to call a program stored in the memory through the bus, to execute the picture data transmission method mentioned above.

The present invention also provides a computer-readable medium with a non-volatile program code executable by a processor, wherein the program code causes the processor to execute the picture data transmission method mentioned above.

The foregoing is merely description of embodiments of the present invention and is not intended to limit the scope of the present invention, and all the equivalent structures or equivalent flow process alternatives, that are made by using the description and accompanying drawings of the present invention and either directly or indirectly applied in other relevant technical fields, likewise fall within the scope of protection of the present invention.

The invention claimed is:

1. A picture data transmission method, comprising:
recoding a first picture to be transmitted, by a picture data sending terminal, to obtain a second picture, wherein a file size of the second picture is smaller than a file size of the first picture;
determining whether a picture quality of the second picture is higher than a pre-set value;
selecting one of the first picture and the second picture based on whether the picture quality of the second picture is higher than the pre-set value; and
sending the selected picture to a picture data receiving terminal.

2. The picture data transmission method according to claim 1, wherein the determining whether the picture quality of the second picture is higher than the pre-set value comprises:
determining whether a picture quality related parameter of the second picture is higher than a threshold value, the picture quality related parameter comprising resolution or brightness.

3. The picture data transmission method according to claim 1, further comprising performing, by the picture data receiving terminal, a corresponding reverse recoding according to data of the second picture received to obtain a third picture.

4. The picture data transmission method according to claim 1, wherein a picture format of the first picture is JPEG, GIF, BMP, PNG, ico or tiff, and a picture format of the second picture is WEBP or HEVC.

5. The picture data transmission method according to claim 3, wherein a picture format of the third picture is the same as a picture format of the first picture.

6. A picture data transmission device, comprising:
a first picture format conversion unit configured to recode a first picture to be transmitted to obtain a second picture, wherein a file size of the second picture is smaller than that of the first picture; and
a picture data transmission unit configured to select one of the first picture and the second picture according to a picture quality of the first picture and a picture quality of the second picture and send the selected picture to a picture data receiving terminal, wherein a picture quality difference between the second picture and the first picture is less than a pre-set threshold.

7. The picture data transmission device according to claim 6, wherein the picture data transmission unit comprises:
a determining sub-unit configured to determine whether the picture quality of the second picture is higher than a pre-set value; and
a picture sending sub-unit configured to send, if the picture quality of the second picture is higher than the pre-set value, the second picture to the picture data receiving terminal, and send, if the picture quality of the second picture is lower than the pre-set value, the first picture to the picture data receiving terminal.

8. A non-transitory computer readable medium comprising program instructions which, when executed by a computer, cause the computer to perform a method of:
recoding a first picture to be transmitted, by a picture data sending terminal, to obtain a second picture, wherein a file size of the second picture is smaller than a file size of the first picture;
determining whether a picture quality of the second picture is higher than a pre-set value;
selecting one of the first picture and the second picture based on whether a picture quality of the second picture is higher than a pre-set value; and
sending the selected picture to a picture data receiving terminal.

9. The non-transitory computer readable medium of claim 8, wherein the determining whether the picture quality of the second picture is higher than the pre-set value comprises:
determining whether a picture quality related parameter of the second picture is higher than a threshold value, the picture quality related parameter comprising resolution or brightness.

10. The non-transitory computer readable medium of claim 8, wherein the method further comprises performing, by the picture data receiving terminal, a corresponding reverse recoding according to data of the second picture received to obtain a third picture.

* * * * *